Jan. 19, 1965   A. B. KARN   3,166,186
PRESSURE SENSITIVE LABELS, LABEL STOCKS, AND
METHODS FOR MANUFACTURING THE SAME
Filed June 25, 1962                     3 Sheets-Sheet 1
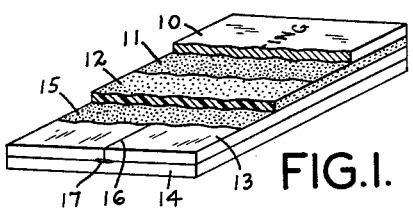
FIG.I.
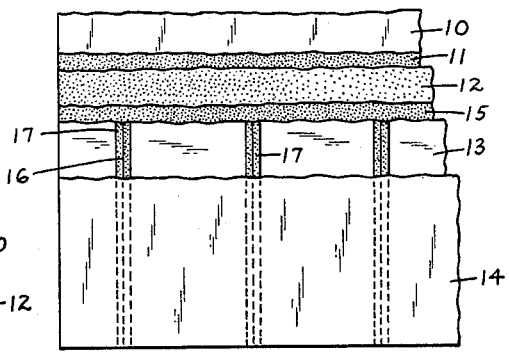
FIG.2.
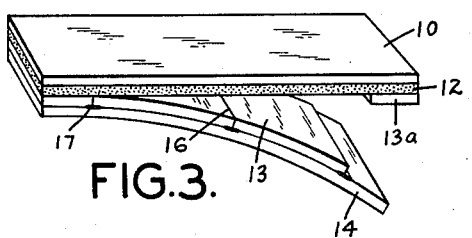
FIG.3.
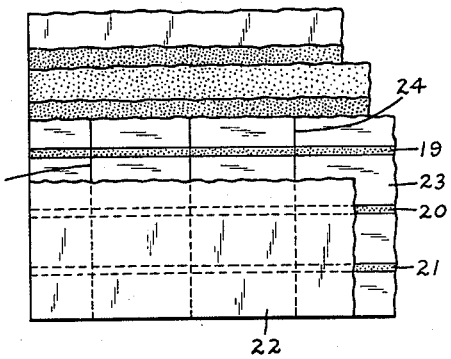
FIG.4.
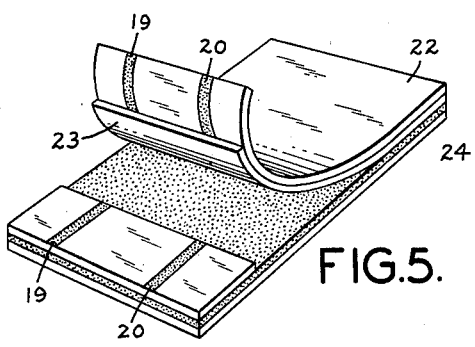
FIG.5.
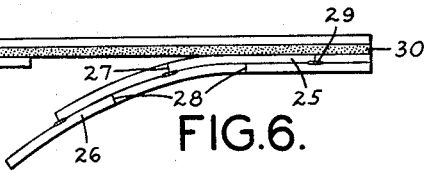
FIG.6.   FIG.7.
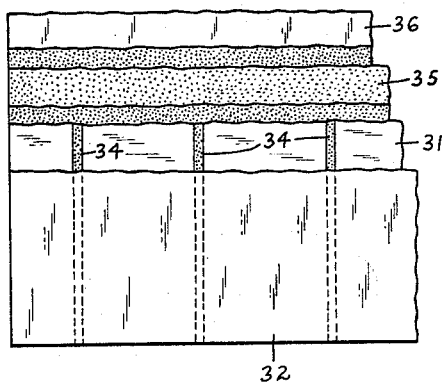
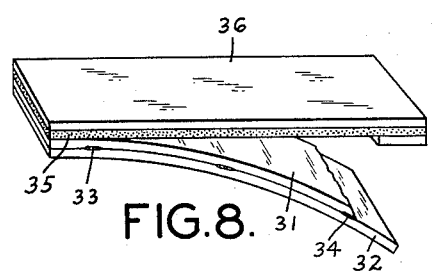
FIG.8.
INVENTOR
ANDREW B. KARN
BY
HIS ATTORNEYS

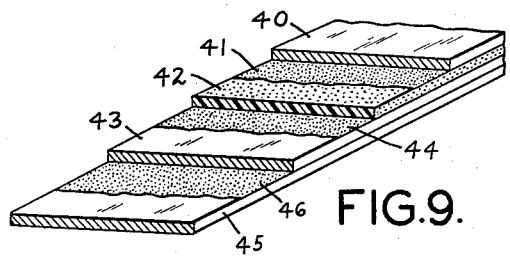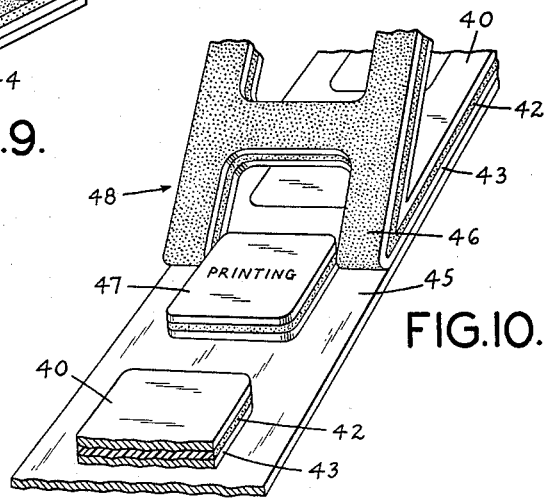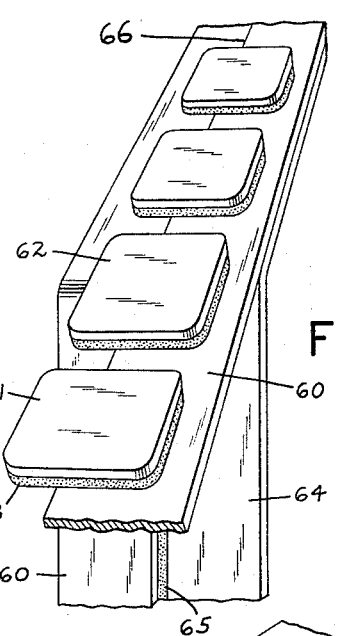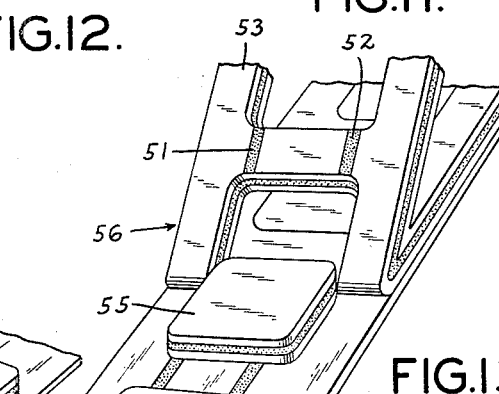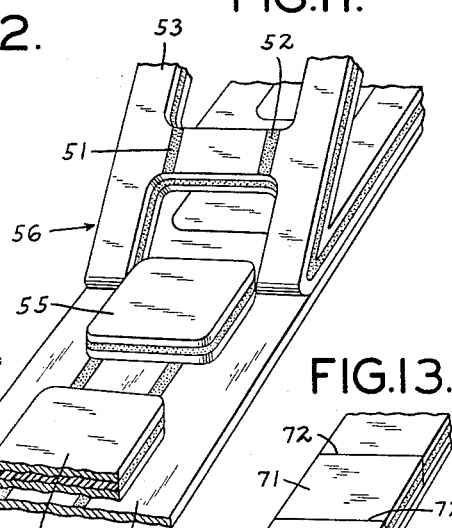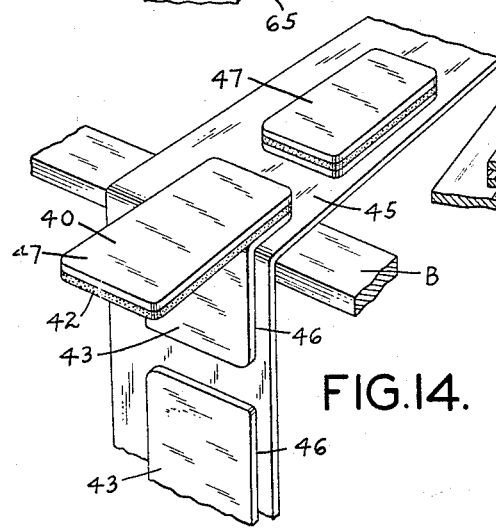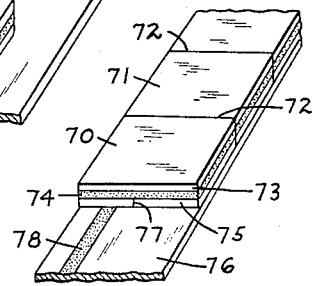

Jan. 19, 1965 A. B. KARN 3,166,186
PRESSURE SENSITIVE LABELS, LABEL STOCKS, AND
METHODS FOR MANUFACTURING THE SAME
Filed June 25, 1962 3 Sheets-Sheet 3

INVENTOR
ANDREW B. KARN
BY
HIS ATTORNEYS

United States Patent Office 3,166,186
Patented Jan. 19, 1965

3,166,186
PRESSURE SENSITIVE LABELS, LABEL STOCKS, AND METHODS FOR MANUFACTURING THE SAME
Andrew B. Karn, 420 E. 86th St., New York, N.Y.
Filed June 25, 1962, Ser. No. 206,135
22 Claims. (Cl. 206—56)

This invention relates to pressure sensitive labels and the label stock from which said labels are made and it relates more particularly to the labels and label stocks used by the graphic arts industry for printing pressure sensitive labels, bumper strips, name plates and the like.

This is a continuation-in-part of my application Serial No. 125,185, filed July 19, 1961, and now abandoned.

Pressure sensitive label stocks currently available for the manufacture of pressure sensitive labels by sheet or flat bed press printing usually consist of a sheet of printable paper, plastic or foil coated with a suitable primer, a layer of pressure sensitive adhesive on the primer coat and a liner or backing sheet which covers the adhesive layer, protects it from contamination and prevents the label or label stock from adhering to adjoining surfaces prior to removal of the liner. A coating of a suitable adhesive repellant which has a low degree of adhesion to the pressure sensitive adhesive is usually applied to the liner in order to render the liner readily removable.

Splits may be formed in the liner to permit easy removal of the liner from the finished label. An ungummed section approximately 3/16 inch wide may be left along the entire length of the split to provide tabs for gripping the liner and removing the sections thereof. In fully gummed stock, the ungummed strip under the split in the liner is not present.

The printing preferably is applied to the stock so that one split only occurs in the liner of each label to enable the liner to be removed in two sections. The printer prefers to have only one split in the liner for two reasons: first, his customer, the user of the label, likes the convenience of removing the liner in two sections only; and second, the printer can not "make ready" over a split. Particularly, when reverse printing is employed, objectionable streaks often appear over the splits. To avoid streaking, the printer may order fully gummed stock thereby sacrificing the ease in removing the backing. However, even the fully gummed stock is subject to streaking above a split, particularly when as often happens, adjoining sections of the liner slide relatively and overlap at the split.

While fully gummed stock is not as subject to the above-mentioned disadvantages, it has another disadvantage, namely, the tendency of the pressure sensitive adhesive to ooze through the split to the outside of the lining, with resulting blocking and sticking together of sheets which causes difficulty and delay in the printing process. Moreover, the adhesive may contaminate the printable surface of an underlying sheet, adding to the problems of the printer.

Both the fully gummed and ungummed types of split back labels and label stocks are subject to sticking and blocking at the edges where oozing of the pressure sensitive adhesive occurs due to the pressure applied thereto by the cutting operation as in, for example, guillotine or knife cutting of the label sections or the weight of overlying stock, when stacked.

Due to the aforementioned difficulties, pressure sensitive split back label stock is usually provided in a variety of split patterns and sizes for use in the production of labels of different sizes so that a single split will appear in the liner of each label. Nevertheless, if a label is too large for an available split pattern, more than one split will occur in the liner. If a label is too small for an available pattern, the sheet is not fully utilized and stock is wasted. Due to these difficulties, the printer frequently must order specially cut stock to fit his particular layout or die cut his own splits in unsplit stock, which results in an increased cost of the material.

In the production of printed pressure sensitive labels in rolls, other problems arise. In such printing arrangements, conventional pressure sensitive label stock with a single sheet continuous liner or backing is repeatedly imprinted with a design. When the imprints are contiguous, a knife is used to separate the individual labels from each other by cutting through the printable stock up to but not through the backing sheet thus forming a roll of so-called "knife cut" labels. In case the printing provides labels which are spaced apart from each other, the labels are cut by means of dies into round, square or rectangular shapes with rounded corners. The cutting edges of the die penetrate through the printable stock up to but not through the backing paper thereby forming a roll of "laid on" labels. Such laid on labels may be printed in one, two or more rows across the width of the sheet of label stock. The problem which confronts the printer in the manufacture of laid on labels is the removal of the waste stock or "matrix" which lies between and around the labels. The matrix is customarily removed in one piece by peeling it or stripping it away from the backing sheet. While the matrix may be peeled away quite readily at a slow rate, it is a characteristic of the pressure sensitive adhesives which are generally most satisfactory for label use that their resistance to peeling increases with the speed of peeling. As a result, at high printing speeds, the matrix tears during the removal process. The only way that this has been overcome in the past is (1) to decrease the speed of stripping, (2) space the labels farther apart to strengthen the matrix, (3) to use an "easy release" type of coating between the liner and the pressure sensitive adhesive, or (4) to apply heat to soften and reduce the adhesion of the pressure sensitive adhesive. All of these expedients have shortcomings, for example, increase in production costs and a decrease in output, waste of stock and possibility of actual peeling away of the labels from the backing with the matrix during the removal of the latter. From the foregoing, it is clear that the prior label stocks leave considerable to be desired in the manufacture of printed labels.

In accordance with the present invention, the difficulties associated with the prior printed label stocks and the labels made therefrom are overcome by providing a second backing on the label which is bonded to the conventional split or continuous liner thereof in such a manner as to provide a flat printing surface on the label stock and provide a carrier or support by means of which printing of the labels either in sheet form or in roll form can be more readily accomplished without the need for specially designed split patterns or the like in the label stock.

More particularly, the provisions of a double liner, or backing, on the label stock enables a single split pattern to be provided which is appropriate for the production of labels of all sizes, or combinations of sizes, the double backing being removable from each label in two parts only, to permit application of the label to a surface. Furthermore, this double liner sheet may be cut down into smaller size sheets of any reasonable dimensions without impairing the effectiveness of the split pattern. Moreover, the presence of a second backing overcomes the tendency of the adhesive to block or bond the various layers together or to contaminate adjacent sheets during or prior to or following printing. In addition, the double back or double liner structure provides a smooth label stock of essentially uniform thickness so that labels are produced which bear uniform clear prints devoid of printing defects.

When the label stock is used in the production of "laid on" rolls of labels, the double backing provides a stronger matrix and assures easier separation of the matrix from the labels and the backing sheet and a more economical use of the material of the labels. By appropriately regulating the adhesiveness of the adhesive bonding the outer backing with the inner lining, removal of the linings in whole or in part to give ready access to the individual labels is achieved, as will be explained in greater detail hereinafter.

For a better understanding of the present invention reference may be had to the accompanying drawings in which:

FIG. 1 is a perspective view of a label embodying the present invention with the various layers thereof shown broken away to disclose the structure thereof;

FIG. 2 is a plan view of label stock from which a label of the type of FIG. 1 is made, the label stock being shown partly broken away to disclose the relationship of the layers or laminations thereof;

FIG. 3 is a perspective view of a label showing the backings partially removed from the label;

FIG. 4 is a plan view of a modified form of a label stock shown partly broken away to disclose the arrangement of layers or laminations thereof;

FIG. 5 is a perspective view of a label formed from the label stock of FIG. 4 showing the backings partially removed from the label;

FIG. 6 is an elevational view of a label of modified form showing the backings being stripped from the label;

FIG. 7 is a plan view of a modified form of label stock of the type shown partly broken away to illustrate the relation of the layers thereof;

FIG. 8 is a perspective view of a label made from a label stock shown in FIG. 7 and illustrating the separation of the backing from the label;

FIG. 9 is a perspective view of a continuously gummed label stock for producing laid on labels;

FIG. 10 is a perspective view of a strip of laid on labels showing the matrix being detached therefrom;

FIG. 11 is a perspective view of a modified type of laid on label stock showing the matrix being stripped therefrom;

FIG. 12 is a perspective view of another form of laid on label stock showing the backings being stripped therefrom;

FIG. 13 is a perspective view of a section of another form of knife cut label embodying the present invention;

FIG. 14 is a schematic illustration of a method and apparatus for removing laid on labels from a backing;

Figure 15:
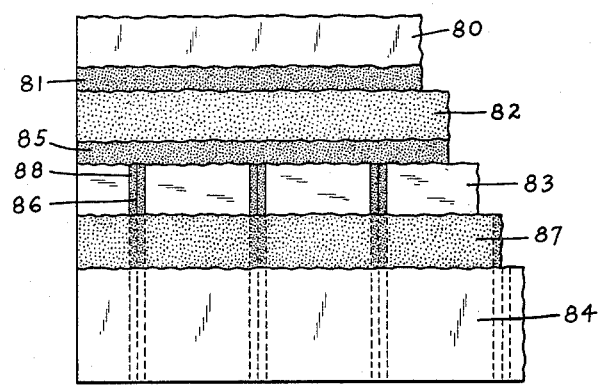
FIG. 15 is a plan view of a modified form of label stock shown partly broken away to disclose the arrangement of the layers or laminations thereof.

FIGS. 1 to 3 illustrate a label and label stock of the type which is used in sheet-type printing operations. As shown in these figures, the label stock and the resulting labels include a printable surface sheet 10 formed of paper, plastic, foil or the like which is capable of receiving printing. One surface of the sheet 10 is provided with a priming coat 11 to enable a layer 12 of pressure sensitive adhesive to be bonded thereto. The label stock is also provided with a double backing including an inner liner 13 and an outer liner 14. The inner liner 13 may be provided with a surface coating 15 of an adhesive repellant or may be of such material as to be slightly adherent to the layer 12 of pressure sensitive adhesive. The inner liner is provided with a series of splits or transverse cuts 16 to enable the inner liner to be separated from the label, after printing, and when the label is to be affixed to a surface by means of the pressure sensitive layer.

In accordance with the present invention, the layer 14 is a continuous sheet of material, such as paper or the like, and is bonded to the inner liner by means of strips or stripes 17 of an adhesive which is adhered more strongly to the inner liner 13 than the latter is bonded to the adhesive layer 12. As shown in FIG. 2, the strips of adhesive 17 are arranged so that they overlie the splits 16 in the inner liner 13. Referring now to FIG. 3, it will be seen that when the stock shown in FIG. 2 is cut apart to form individual labels, the inner liner 13 will have one or more splits therein. The outer liner or backing 14 is continuous and inasmuch as it is secured to the inner liner only by means of strips 17 of the adhesive, it will have a free edge at one end or the other or at both ends which can be gripped with the fingers to enable the liner to be stripped from the imprinted label. As shown in FIG. 3, when the end of the liner 14 is pulled away, it will also pull away the underlying sections of inner liner 13 and will remove all of it except the portion 13a of the liner 13 gripped with the fingers. The remaining portion 13a of the inner liner can be readily peeled from the pressure sensitive adhesive because of its low adherence thereto.

Inasmuch as there are no ungummed strips under the splits 16 in the inner liner 13 and the liner sections 13 are in substantial edge-to-edge relationship to each other, with no overlapping or gaps, and the outer backing 14 provides additional cushion for the printing plate, the printing is uniform across the splits. Any tendency for any ridge or rib to appear at the zone of the splits 16 and adhesive 17 can be avoided by proper calendering of the liners 13 and 14 after they have been united by means of the adhesive strips which are preferably applied to the outer liner 14 during the manufacture thereof. The splits 16 may be subsequently added by cutting through the liner 13 and the adhesive strips 17 up to, but not through, the outer liner 14. An alternate method of manufacture is to laminate the outer liner 14 to the split inner liner 13 after the latter has been combined with pressure sensitive adhesive coated label stock.

With the label stock in which there are splits in the inner liner and layers 17 of adhesive are applied over the splits, it will be apparent that almost any desired shape or size of label can be cut from the stock and will afford easy stripping of the liners therefrom so long as the size of the labels is such as to include one split in the inner liner thereof. The closer the splits are spaced, the smaller the label which may be processed without wasting label material.

With the new stock, the printer can plan his layouts so that one or more splits will be present in the inner liner or backing of each label produced, without any substantial waste of the label material.

The arrangement of the adhesive strips between the inner and outer liners can, of course, be modified very substantially. While as shown in FIGS. 1 to 3, the adhesive strips 17 coincide generally with the splits 16, they can actually extend transversely thereof. As shown in FIGS. 4 and 5, the strips of adhesive 19, 20 and 21 between the outer liner 22 and the inner backing or liner 23 extend crosswise of the splits 24 and bond the liners together with sufficient tenacity that when the edge or corner of the outer liner 22 is pulled away, it will also pull away an underlying part of the inner liner 23 leaving only that portion which is gripped with the fingers.

Also, while the forms of label stocks and labels illustrated in FIGS. 1–5 have been shown as having continuous splits extending across the label stock, it will be understood that these splits may be discontinuous and there may be small connecting tongues or bridges which span the splits. The advantage of this construction is that it enables the inner liner to be pre-slit prior to bonding it to the outer backing, without the risk of relative shifting of the sections of the inner liner defined by the slits.

Further modification of the double backing may be accomplished, as for example, shown in FIG. 6. In this form of double backed label, the inner lining 25 as well as the outer lining 26 each are provided with splits or slits 27 and 28 which, as shown, are offset with respect to each other. Strips or stripes of adhesive 29 are applied to continuous surfaces of the outer liner 26 overlying the splits 27. In this way, the outer liner and the inner liner reinforce each other and prevent shifting and the formation of ridges or grooves which would produce printing smudges or irregularities but nevertheless provide convenient means for peeling the two liners from the label by lifting the outer liner at any of the splits 28 therealong. It will be understood that in this form of the invention as well as in those previously described, the adhesion or the tenacity of the adhesive strips 28 is greater than the adhesion of the inner liner to the pressure sensitive adhesive layer 30 due to the presence of a repellant coating on the inner surface of the liner 26 or its natural repellancy to the layer of pressure sensitive adhesive.

All of the above-described label stocks and labels are of a type in which at least the inner liner is provided with a series of splits to facilitate separation of the liners from the label and its pressure sensitive backing.

FIG. 8 shows a modification in which the inner liner 31 and outer liner 32 are both continuous. The inner liner is formed of a material such as paper which, due to orientation of the fibers, or a different fiber structure, is more readily torn than the outer layer 32. Interposed between the layers 31 and 32 are strips of adhesive 33, 34 and so forth which bond the strips together more strongly than the tear strength of the inner liner 31. Accordingly, when a free edge of the outer liner is lifted and pulled the inner liner will tear as shown in FIG. 8 to enable both of the liners to be stripped from the pressure sensitive layer 35 on the label sheet 36.

The above-described labels and label stocks are useful for the sheet printing operations and for that reason are provided with the splits or other means which enable the backings to be stripped readily from the imprinted labels.

In the production of laid on labels, i.e., labels which are imprinted and are carried on a backing which also enables the labels to be rolled up into a roll, the double backing may be continuous. Referring to FIGS. 9 and 10, a typical continuous stock includes a sheet 40 capable of receiving printing and bearing a priming coat 41 to which a layer of pressure sensitive adhesive 42 is united. An inner liner 43 is adjacent to the pressure sensitive adhesive and may be provided with a repellant coating 44 or may be of such nature as to have a natural repellancy such that it is united weakly with the pressure sensitive adhesive. Interposed between the outer liner 45 and the inner liner 43 is a layer of adhesive 46 which bonds the liners 43 and 45 together more tenaciously than the liner 43 is bonded to the layer of pressure sensitive adhesive 42.

When a sheet or strip of such stock is passed through a printing and die cutting apparatus the dies will be adjusted to cut through the upper sheet 40, the layer of pressure sensitive adhesive 42 and the inner liner 43 but not through the outer liner 45. In this way, a series of labels 47 and so forth are formed in spaced relation along the length of the liner 45 which thereby serves as a carrier or transporter for the labels. It is customary to remove the portion between and around the labels 47 and the portion 48 or matrix which surrounds the labels is stripped off, leaving one or more rows of labels on the backing 45 which can be rolled up for wrapping, shipping etc. By providing an adhesive, 46 of appropriate characteristics, the matrix 48 can be stripped off with ease, under the high speed conditions of laid on label manufacture, while leaving the labels in place, supported by a backing strip of a suitable type which facilitates their handling in printing, dispensing, or other operations.

It should be noted that the matrix 48 is considerably more resistive to tearing than is the matrix of laid on label strips of the present art, since it incorporates the thickness of the inner liner 43. FIG. 14 shows a label 47 being dispensed from a roll of laid on labels such as might be manufactured as illustrated under FIG. 10. Under the slow speed conditions of dispensing, the bond between the inner liner 43, and the outer backing 45 is greater than the bond between the liner 43 and the layer of pressure sensitive adhesive 42 and thus, when the roll of laid on labels is made to bend back sharply, as is typically accomplished in a dispensing device, represented in the drawing by a metal bar B, the inner liner sections 43 will remain adhered to the backing 45 while the portions of the labels 47 consisting of upper sheet material 40 and pressure sensitive adhesive layer 42 will peel away from the inner liner 43, ready for use.

As shown in FIG. 10, the coating of adhesive 46 is continuous but it can be applied as strips or stripes between the inner and outer backings or liners. In the label stock shown in FIG. 11, the outer backing 50 is provided with two or more stripes 51 and 52 of adhesive which unites it with the inner liner 53 strongly enough to hold them together and to support the individual labels 54, 55 etc., when the matrix 56 is peeled away from the supporting outer liner 50.

Difficulties formerly encountered in peeling laid on labels from a supporting backing are overcome by modifying the inner liner in the manner shown in FIG. 12. In this label stock, the inner liner 60 is adhered lightly to the labels 61, 62 etc., and the pressure sensitive layer 63. In shaping the labels, the die is adjusted to cut through the label and the pressure sensitive layer. An outer liner 64 is secured to the inner liner 60 by means of a strip of adhesive 65 overlying a split 66 which extends lengthwise of the inner liner. After the matrix has been removed, the outer liner 64 can be peeled off carrying with it half of the inner liner 60 and leaving the labels secured to the other half of the inner liner and with their edges projecting beyond its edge. In this way, the labels can be readily gripped and peeled from the supporting half of the inner liner.

In a similar manner, knife cut labels, that is, labels in which the individual labels are separated merely by knife cuts can be provided in rolls as shown in FIG. 13. In this form of label strip, the individual labels 70, 71, etc., are separated by knife cuts 72 which extend through the printable sheet or surface 73, the pressure sensitive adhesive 74, the inner liner 75 but not through the outer liner 76. The inner liner 75 is provided with a lengthwise extending slit 77 and the liners are bonded together by means of a strip of adhesive 78 which extends parallel with the slit 77. When the liner 76 is peeled from the strip of labels, it will also carry with it the portion of the inner liner 75 to the left of the slit 77, as viewed in FIG. 13, and leave the other portion of the inner liner 75 to the right of the slit 77 in contact with its respective label, by which means the label may be grasped in a manner as not to contaminate the pressure sensitive adhesive prior to and during the application of the label to a surface. Alternately, the liner 76 of FIG. 13 may be peeled from the strip of labels in such a manner as to release a series of conventional split back labels, with split single backing sheet fully intact.

In label stocks of the type described above, some printing difficulties may occur due to the fact that bonding between the double liners is intermittent. Such difficulties can be avoided in a number of different ways, such as, for example, by means of the label construction shown in FIG. 15 of the drawings. The label stock disclosed in this figure is generally similar to that disclosed in FIG. 2 of the drawing and includes a printable surface sheet 80 provided with a priming coat 81 and a layer 82 of pressure sensitive adhesive bonded thereto. A double backing, including an inner liner 83 and an outer liner 84, is adhered weakly to the pressure sensitive adhesive 82 by means of carrier layer 85 or the inner liner may be only slightly adherent to the layer 82 of pressure sensitive adhesive. The inner liner is provided with splits 86 to enable it to be peeled from the pressure sensitive coating.

Interposed between the liners 83 and 84 is a coating of adhesive 87 which is only slightly adherent to the liner 83, but is strongly adherent to the strips 88 of adhesive which are applied over the splits in the liner 83. Suitable types of coadhesives or contact adhesives may be used in the strips 88 and in the coating 87 to enable separation of the liner 84 from the liner 83 between the strips 88. In this way, a free edge or corner of the liner 84 of a label cut from the stock may be lifted by pushing the finger across the edge or corner of the label to enable the freed edge or corner to be gripped. When the liner 84 is peeled from the label it will strip one or more of the sections of the inner liner 83 from the adhesive layer 82 because of the adherence between the outer liner 84 and the strips 88 of adhesive on the inner liner 82.

The weak adhesion between the coating 87 and the uncoated outer surface of the liner 83 is sufficient to prevent buckling or creeping of the liners relative to each other but will not prevent a corner or an edge of the outer liner 84 from being freed between the splits in the inner liner 83. Coadhesive or contact adhesives may be used in a similar manner in other forms of label stocks described above. Similar results are obtainable by applying weak adhesive in the areas between strips 88 of strong adhesive which join the inner and outer liners 83 and 84.

Figure 16:
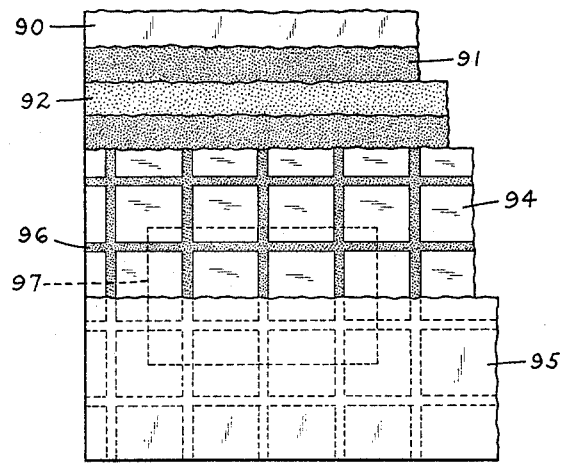
FIG. 16 is a plan view of still another form of label stock shown partly broken away to disclose the arrangement of the layers or laminations thereof.

FIGURE 16 discloses another manner of preventing buckling of the label stock. FIGURE 16 shows a continuous unsplit liner structure similar to that disclosed, for example, in FIGURE 9, and includes a label sheet 90, a primer coat 91, a layer of pressure sensitive adhesive 92, a repellent coat 93 and the inner and outer liners 94 and 95. A grid work 96 of bands of adhesive which cross each other in relatively close spaced relation connects the liners 94 and 95. While the grid work 96 is shown as disposed with the crossing bands parallel to the edges of the stock, it will be understood that the bands of the gridwork can be inclined to the edges or arranged in a diamond pattern, they can be discontinuous, or sinuous or zigzag. In any case, when labels are cut from this label stock as, for example, the label 97 shown in dotted lines in FIG. 16, one or more corners or edges of the outer liner 95 will be unadhered or only lightly adhered to the inner liner 94 so that a corner can be lifted and the inner and outer liners peeled simultaneously from the pressure sensitive layer 92. By passing the completed label stock or the two liners between pressure rolls a sheet of uniform thickness is formed in which the air is expelled from the pockets defined by the bands of adhesive. With a non-porous outer liner 95, such as suitably coated paper, air cannot enter these pockets and atmospheric pressure tends to force the liners together tightly so that relative expansion and/or buckling is prevented.

In the preparation of the various forms of label stocks, a pressure sensitive adhesive such as any of the known natural or synthetic rubber-containing adhesives and a suitable primer or the like are applied to the printable sheet in the usual way.

In making the double backed stock, the strip or sheet corresponding to the outer liner may be coated or striped with the adhesive and then joined with the inner liner which may either be continuous or split before or after assembling with the outer liner. The assembled inner and outer liners are passed through calendering rolls which reduce the joined liners to a uniform thickness to avoid the formation of ridges. Adhesives such as heat set adhesives, waxes, synthetic resins, contact adhesives and the like which provide good adhesion in films of negligible thickness are readily available and can be used for joining the liners.

The double liner may be joined to the adhesive coated label stock in the same way as a single backing, in a manner to form the completed label stock.

From the foregoing, it will be understood that label stocks of the types embodying the present invention are susceptible to considerable variation in the manner in which the inner and outer liners are bonded together and in which the splits and adhesive layers are arranged and that arrangements other than those disclosed herein are possible. Accordingly, the forms of the invention described herein should be considered as illustrative and the invention should not be considered as limited except as defined in the following claims.

I claim:

1. A label comprising a sheet for receiving printed matter on one surface thereof, a layer of pressure-sensitive adhesive on the other surface of said sheet, an inner liner having one side adhered to and covering said layer of adhesive and separable from said layer of adhesive, and an outer liner on the opposite side of said inner liner and at least one narrow strip of adhesive adhering said liners to each other more strongly than said inner liner is adhered to said layer of adhesive, both of said liners being removable from said sheet and said outer liner having at least one portion adjacent to said strip readily separable from said inner liner, said separable portion of said outer liner carrying with it a portion of said inner liner adhered to the outer liner by said strip when said outer liner is removed completely.

2. The label set forth in claim 1 comprising a slit extending across and through said inner liner within the area of said strip of adhesive.

3. The label set forth in claim 1 comprising a slit extending across and through said inner liner.

4. The label set forth in claim 3 in which said slit is discontinuous.

5. The label set forth in claim 1 comprising adhesive less adherent than said strips adhering said separable portion to said inner liner.

6. The label set forth in claim 1 comprising slits in and extending across said inner and outer liners, the slits in said inner liner being offset from the slits in said outer liner.

7. Label stock comprising a sheet of material having one surface for receiving printed matter, a layer of pressure-sensitive adhesive on the opposite surface of said sheet, an inner liner adhered lightly to and covering said layer of adhesive, an outer liner substantially coextensive with and adjacent to said inner liner, both of said liners being removable from said sheet, and a plurality of spaced apart strips of an adhesive more adherent than said pressure sensitive adhesive securing said outer liner to said inner liner, said outer liner having portions between said strips readily separable from said inner liner.

8. The label stock set forth in claim 7 in which said strips of adhesive for securing said outer liner to said inner liner form a gridwork between said inner and outer liners.

9. The label stock set forth in claim 7 comprising adhesive interposed between said strips adhering said inner and outer liners weakly between said strips.

10. The label stock set forth in claim 9 in which said inner liner has slits extending along at least some of said strips dividing said inner liner into a plurality of separate sections.

11. The label stock set forth in claim 7 in which said inner liner has at least one slit therein dividing it into a plurality of sections retained against relative movement by said outer liner.

12. The label stock set forth in claim 11 in which said strips of adhesive securing said outer liner to said inner liner are confined to narrow zones on both sides of each slit in said inner liner.

13. The label stock set forth in claim 11 in which said slit is discontinuous.

14. The label stock set forth in claim 11 in which said adhesive for securing the outer liner to the inner liner is substantially coextensive with said inner liner.

15. The label stock set forth in claim 11 in which said strips of adhesive for securing said outer liner to said inner liner extend lengthwise of said sheet.

16. The label stock set forth in claim 11 in which said strips of adhesive for securing said outer liner to said inner liner extend cross-wise of said sheet.

17. Label stock comprising an outer liner, a plurality of labels on said outer liner, each label comprising a sheet of material for receiving printing on one surface thereof, a layer of pressure-sensitive adhesive on the opposite surface of said sheet, an inner liner adhered lightly to said pressure-sensitive adhesive, and at least one strip of an adhesive more adherent than said pressure-sensitive adhesive and narrower than said liners bonding said inner liner of each label to said outer liner, said outer liner having portions adjacent to said strip readily separable from said inner liner.

18. The label stock set forth in claim 17 in which said labels are in spaced-apart relation on said outer liner.

19. The label stock set forth in claim 18 in which said inner liner of said label has a slit therein extending lengthwise thereof and dividing it into sections, and said strip of adhesive bonding said inner liner to said outer liner extends lengthwise of said label.

20. The label stock set forth in claim 17 in which said labels are in substantially edge-to-edge relation on said outer liner.

21. The label stock set forth in claim 20 in which said inner liner of said label has a slit therein extending lengthwise thereof and dividing it into sections, and said strip of adhesive bonding said inner liner to said outer liner extends lengthwise of said label.

22. A method of producing laid-on labels from the label stock set forth in claim 7 comprising cutting through said sheet material, said pressure-sensitive adhesive and said inner liner to form a plurality of spaced labels and a matrix around said labels bonded to said outer liner, and stripping said matrix from said outer liner leaving said labels bonded to and supported by said outer liner.

References Cited in the file of this patent

UNITED STATES PATENTS

| | | |
|---|---|---|
| 1,996,835 | Scholl | Apr. 9, 1935 |
| 2,732,065 | Marchese | Jan. 24, 1956 |
| 2,831,277 | Strachan | Apr. 22, 1958 |
| 2,883,044 | Kendrick | Apr. 21, 1959 |
| 2,679,928 | Bishop | June 1, 1959 |
| 3,032,463 | Morgan | May 1, 1962 |
| 3,038,597 | Brady | June 12, 1962 |